United States Patent
Leggo et al.

(10) Patent No.: US 10,229,402 B2
(45) Date of Patent: Mar. 12, 2019

(54) COMMUNICATION METHOD, CONTROLLER, AND SYSTEM FOR MANAGING COMMUNICATIONS WITHIN CHECKOUT SYSTEM

(71) Applicant: Fujitsu America, Inc., Sunnyvale, CA (US)

(72) Inventors: Jeffrey Leggo, Montreal (CA); Jonathan Schwartz, Montreal (CA); Mihaela Givulescu, Montreal (CA)

(73) Assignee: FUJITSU AMERICA, Inc., Sunnyvale, CA (US)

( * ) Notice: Subject to any disclaimer, the term of this patent is extended or adjusted under 35 U.S.C. 154(b) by 459 days.

(21) Appl. No.: 14/981,996

(22) Filed: Dec. 29, 2015

(65) Prior Publication Data

US 2017/0185984 A1 Jun. 29, 2017

(51) Int. Cl.
| | |
|---|---|
| *G06Q 20/20* | (2012.01) |
| *G06Q 30/06* | (2012.01) |
| *G08B 5/36* | (2006.01) |
| *G07G 3/00* | (2006.01) |
| *G08B 13/24* | (2006.01) |
| *G08B 25/00* | (2006.01) |

(52) U.S. Cl.
CPC ......... *G06Q 20/202* (2013.01); *G06Q 20/204* (2013.01); *G06Q 30/06* (2013.01); *G07G 3/00* (2013.01); *G08B 5/36* (2013.01); *G08B 13/246* (2013.01); *G08B 25/006* (2013.01)

(58) Field of Classification Search
CPC ...... G06Q 30/06; G06Q 20/202; G06Q 20/20; G06Q 20/3278; G06Q 20/209; G08B 5/36
USPC .......................................................... 705/21
See application file for complete search history.

(56) References Cited

U.S. PATENT DOCUMENTS

| | | | |
|---|---|---|---|
| 6,497,362 B2 | 12/2002 | Persky et al. | |
| 7,558,742 B2 | 7/2009 | Kloubakov et al. | |
| 8,430,310 B1 * | 4/2013 | Ho | G06F 21/35 235/382 |
| 2014/0349692 A1 * | 11/2014 | Zhou | G06Q 20/3829 455/466 |

OTHER PUBLICATIONS

Kopecky II, Kenneth Edward. A software framework for initializing, running, and maintaining mixed reality environments. Iowa State University, ProQuest Dissertations Publishing, 2014.*

* cited by examiner

*Primary Examiner* — Florian M Zeender
*Assistant Examiner* — Fawaad Haider
(74) *Attorney, Agent, or Firm* — Fujitsu Patent Center (57) ABSTRACT

A communications controller and method is provided for use in a checkout system including at least one POS terminal and a wrist-worn wearable device. The communications controller includes an alert server and one or more adapters. The alert server receives transaction information from a POS terminal, processes the transaction information to identify the POS terminal and an issue relating to the POS terminal to be resolved. An adapter develops alert information for the wrist-worn wearable device to enable the wrist-worn wearable device to display a notification associated with the issue relating to the POS terminal and to receive an input to resolve the issue relating to the POS terminal. The alert information is based on the transaction information and specifications of the wrist-worn wearable device.

17 Claims, 10 Drawing Sheets

| Customer Station Message | Supervisor Station Messages | Type of Alert Message | Message on the Band | Action Buttons | Action Required |
|---|---|---|---|---|---|
| "Please wait" | "Cancel order" | Blocking | Cancel the order | Ok (block) | Go help Customer |
| | "Customer card not on file" | | Assist with NOF card | Ok (Ack) | Clear the intervention, have customer re-scan |
| | "Direct intervention required" | | Assist customer | Ok (block) | Go help Customer |
| | "Bar code will not scan" | | Help: barcode | Ok (Ack) | Go help Customer |
| "Please wait" | N/A | Blocking/Security violation | Replace removed wgt | Ignore | Clear intervention, have customer re-scan |
| "Please wait" | N/A | Blocking | Wgt security offline | Ok (Block) | Clear intervention, have customer re-scan |
| "Please wait" | N/A | Blocking | Assess bag scale | Ok (Block) | Go help Customer |
| "Please wait" | "Weight violation with own bag(s)" | Blocking/Security violation | Help: My Bag | Ignore | Clear intervention, have customer re-scan |
| "Please wait for the attendant" | "Direct intervention required" | Blocking | Assist customer | Ok (Ack) | Go help Customer |
| | "Void Item Requires Intervention" | | Help: voided item | | |
| | "Problems collecting signature" | | Fix signature issue | | |
| | "Problems during cash entry: …" | | Help: cash | | |
| | "Cannot start: Order In Progress" | | Help: start order | | |
| | "Customer Requires Attention" | | Assist customer | | |
| | "Non bar-coded item" | | Help: NBC item | | |
| | "Customer requires assistance" | | Assist customer | | |
| "Please remove last item from bag and re-scan" | N/A | Blocking/Security violation | Remove added | Ignore | Clear intervention, have customer re-scan item |
| "Please wait until the bagging area is clear" | N/A | Blocking/Clear collection area | Help: clear lane | Ok (Ack) | Go help Customer |
| "Please show your ID to the attendant" | "Age verification required" | Blocking | Verify customer age | Ok (Ack) | Go help Customer |
| "Place non-barcoded item on scanner and wait" | "Non bar-coded item" | Customer go back a screen | | | |
| "Place item scanned on the scanner and wait" | "Quantity required" | Customer go back a screen | | | |
| "Please give the item to the attendant" | "Take item from customer" | Blocking | Take item from cust. | Ok (Block) | Go help Customer |
| | | Delayed Intervention | | | |
| "Give all your coupons to the attendant" | "Customer has coupons" | Customer go back a screen | | | |
| "Give the last coupon scanned to the Coupon requires assistance" | "Coupon entry fails" | Blocking | Help: coupons | Ok (Ack) | Go help Customer |
| "This item requires assistance. Set it aside and continue with your order." | "Assistance with some items required" | Delayed Intervention | | | |
| "Please give check to the attendant" | "Customer has check..." | Delayed Intervention | | | |
| "Wait for the attendant to complete" | N/A | Customer go back a screen | | | |
| | "Customer requires assistance" | Customer go back a screen | | | |
| | | Blocking | Assist customer | Ok (Ack) | Go help Customer |
| "Your order has been canceled. Please wait for attendant to return payment." | "Return tenders/coupons to the customer" | Blocking | Help: voided order | Ok (Ack) | Go help Customer |
| "Cannot be performed at this station. Proceed to the attendant for assistance." | N/A | Blocking | Help: recall order | Ok (block) | Go help Customer |

FIG. 10

COMMUNICATION METHOD, CONTROLLER, AND SYSTEM FOR MANAGING COMMUNICATIONS WITHIN CHECKOUT SYSTEM

BACKGROUND OF THE INVENTION

Computer-based POS systems are now common in the retail environment. Such systems include one or more checkout terminals (i.e., checkout terminals or computerized "cash" registers) and a database of prices, inventory and other information related to the items for purchase. Each checkout terminal typically includes a bar code scanner which can detect a machine readable bar code on the packaging to identify a scanned item. When an item is scanned, the scanner sends a signal corresponding to the product number of the item to a data processing component of the POS system, which then obtains from the database information relating to the scanned item such as price and description. The one or more checkout terminals may include an attendant-checkout terminals and/or a self-checkout terminal.

Self-checkout systems (such as the U-SCAN® available from Fujitsu) include self-checkout terminals (each of which typically includes a bar code scanner with an integrated scale) that allow customers to scan bar codes on the items they are purchasing. The checkout terminal may also have other input and output devices (such as, e.g., a numeric keypad, a video camera and a display). These systems allow customers to directly perform checkout activities such as scanning barcoded items, selecting modes of payment (e.g., credit or debit card), carrying out payment using automated payment accepting means (e.g., credit or debit card readers), requesting assistance, and explanations on how to use the checkout terminal.

Both attendant-checkout terminals and self-checkout terminals may have a signaling device (e.g., a call button, an "Assist" key on a keypad or other device) for use by the attendant or customer to request assistance. Assistance may be required when a price check is needed, for example. This assistance request may be sent to, and processed at, a supervisory station. The supervisory station permits a store employee (i.e., a supervisory employee) to perform a range of supervisory activities overseeing and controlling checkout at the checkout terminals. Supervisory terminal hardware may include a video display used to display video images (e.g., from a video camera or other imaging device at a checkout terminal), a touch screen, a POS keyboard, a PC keyboard, a receipt printer, and a cash drawer, etc.

Supervisory activities include, among others, providing authorization when a customer is purchasing an age restricted item. Prior to making an authorization, the supervisor verifies age of the customer and provides authorization for the customer to purchase the age restricted item. Supervisory activities also include making decisions when the checkout terminal detects a discrepancy between the actual weight of an item and the expected weight of that item ("weight violation"), for example. Weight violation activities of the supervisor typically involve either clearing the violation to allow the purchase or removing the item from the order (hereafter, "voiding the item") and asking the customer to try again. A supervisor may also provide explanations to customers on how to use the self-checkout terminal and/or check out items on behalf of the customer, (such as when the items are too heavy or too large to be scanned by a fixed barcode reader mounted on the checkout terminal or when the customer seeks assistance for completing the checkout). Additional activities include enabling and disabling operations at the checkout terminals, video surveillance of the customer activities, use of a cash drawer to accept cash payment and dispense change, printing a cashier receipt, printing end-of-day, end-of-week and end-of-month reports, and other software or system maintenance activities.

An example of self-checkout systems are described in e.g., U.S. Pat. Nos. 6,497,362 and 7,558,742. Some self-checkout systems such as the one disclosed in U.S. Pat. No. 7,558,742 provides mobile supervisory terminals. However, the mobile supervisory terminals generally include operating systems and thus, process communication in a manner similar to the supervisory stations even though input may be somewhat more limited.

SUMMARY OF THE INVENTION

Example embodiments of the present invention provide a checkout system. The system includes a communication controller, which controls communications with at least one of the following: one or more self-checkout terminals; one or more attendant stations; one or more supervisory stations, one or more wearable devices. Each supervisory terminal and each wearable device may be used to conduct a corresponding set of supervisory activities over operations at checkout terminals. The communications controller provides central processing and communications between the one or more self-checkout terminals; one or more attendant terminals; one or more supervisory terminals; and one or more wearable devices. Wearable devices such as wrist-worn wearable devices that include wearable bands or watches provide improvements over conventional mobile supervisory terminals or devices based on the usability and convenience of the devices. For example, a wrist-worn wearable device may provide hands-free notifications to the user and not have to be retrieved from a pocket, purse or other holder. A wrist-worn wearable device can provide a notification directly, whereas a conventional mobile supervisory terminal, device or cellphone may require a security password and/or opening of an app before receiving a notification or alert message. Social etiquette may be improved from the standpoint of glancing at the wrist-worn wearable device while providing customer assistance to another customer may be less intrusive that obtaining the same information from a mobile supervisory terminal and/or smartphone application.

However, wrist-worn wearable devices impose limitations due to size, graphical display size capability, input availability and processing capability. For example, most wrist-worn wearable devices do not include an operating system for processing communications and data. An operating system being system software that manages computer hardware and software resources and provides common services for computer programs. The operating system is a component of the system software in a computer system. Application programs usually require an operating system to function.

At least in part because of a lack of an operation system, wrist-worn wearable devices must receive information in a specific format to be handled correctly or effectively. The output or responses from the wrist-worn wearable device are also limited based on specifications of the wrist-worn wearable device. Accordingly, example embodiments described in this application are implemented to efficiently and effectively obtain the user convenience advantages provided by a wrist-worn wearable device while overcoming limitations such as size, display size, graphics capability, input availability and processing capability.

An example embodiment is direct to a method of processing checkout information within a retail checkout system having at least one Point of Sale (POS) terminal, a communication controller, and a wrist-worn wearable device. The method includes receiving, at the communication controller, transaction information from a POS terminal; processing, at the communication controller, the transaction information identifying the POS terminal and an issue relating to the POS terminal; developing, at the communication controller, alert information for the wrist-worn wearable device to allow the wrist-worn wearable device to resolve the issue relating to the POS terminal, the alert information being based on the transaction information and specifications of the wrist-worn wearable device.

An example embodiment is direct to a communications controller for use in a checkout system including at least one POS terminal and a wrist-worn wearable device in communication with the communications controller. The communications controller includes an alert server configured to receive transaction information from a POS terminal, process the transaction information to identifying the POS terminal and an issue relating to the POS terminal to be resolved; and an adapter configured to develop alert information for the wrist-worn wearable device to enable the wrist-worn wearable device to display a notification associated with the issue relating to the POS terminal and to receive an input to resolve the issue relating to the POS terminal, the alert information being based on the transaction information and specifications of the wrist-worn wearable device.

An example embodiment is directed to a checkout system. The checkout system includes a POS terminal configured to process a retail transaction; a wrist-worn wearable device configured to receive input from a user that provides supervisory support to the POS terminal; and a communication controller configured to receive transaction information from the POS terminal, process the transaction information identifying the POS terminal and an issue relating to the POS terminal, and develop alert information for the wrist-worn wearable device to allow the wrist-worn wearable device to acknowledge or resolve the issue relating to the POS terminal, the alert information being based on the transaction information and specifications of the wrist-worn wearable device.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

Figure 1:
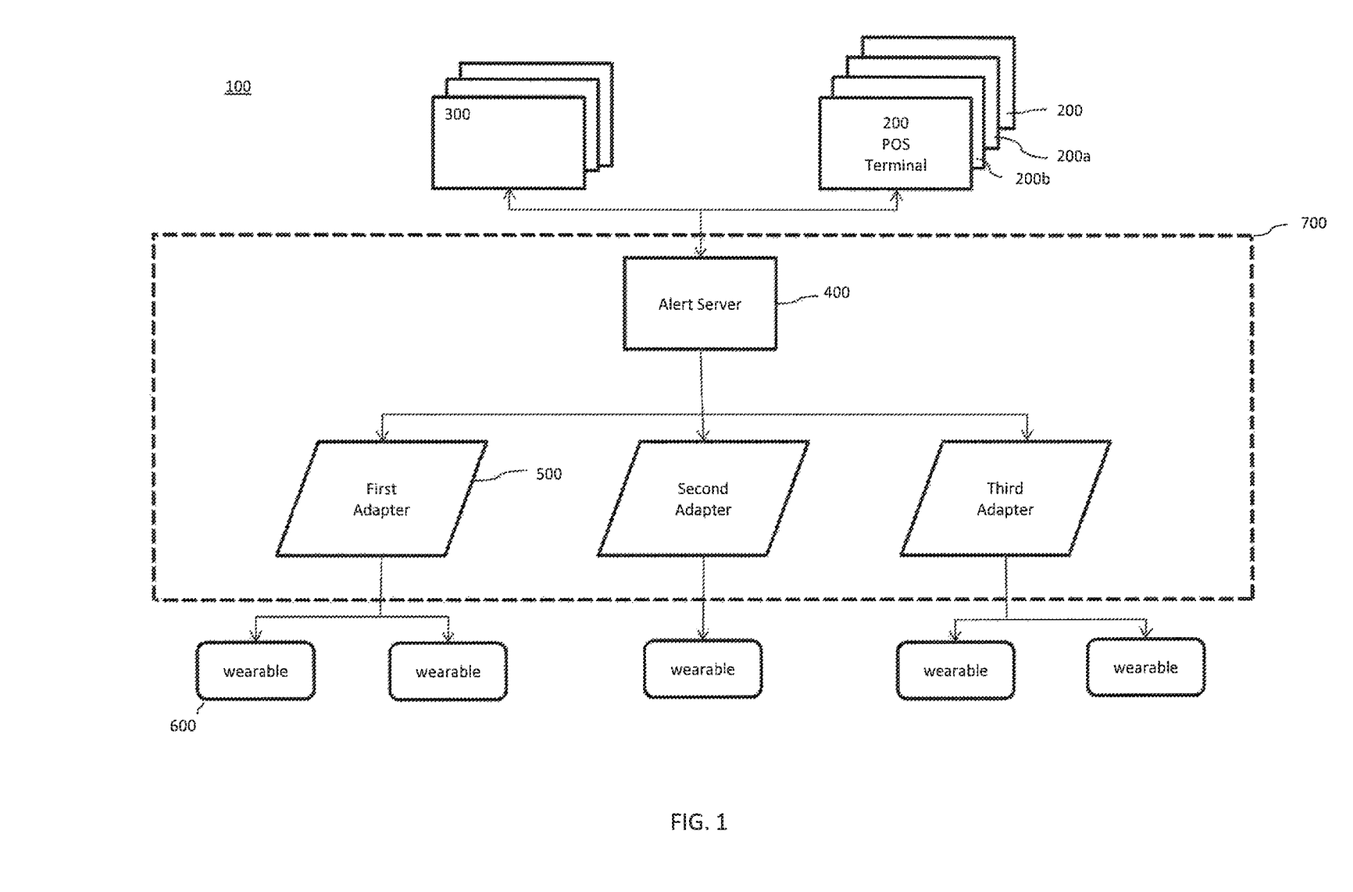
FIG. 1 is a block diagram of an example embodiment of a checkout system.

Checkout system 100 of FIG. 1 includes one or more retail POS terminals 200, one or more supervisory stations 300, a communication controller 700, and one or more wrist-worn wearable devices 600. The different components of the checkout system 100 communicate via wired or wireless communications via a network. For example, one or more components of the system may communicate using one or more networks such as a local area network (LAN). The communications may be performed using one or more communication standards such as e.g., Ethernet, IEEE 802.11b, Bluetooth technologies.

The retail POS terminals may be self-checkout terminals 200a or attendant checkout terminals 200b. When a distinction is not required between a self-checkout terminal 200a and an attendant checkout terminal 200b, the self-checkout terminal and an attendant checkout terminal will simply be referred to as POS terminal(s) 200. The POS terminals 200 are locations within a retail environment in which customers can purchase retail items such as groceries or merchandise. Supervisory or general control is sometimes needed to complete transactions at the POS terminals 200. For example, an attendant checkout terminal 200b may need assistance when a price check is required. A self-checkout terminal 200a may require assistance in similar situations to an attendant checkout terminal 200b in addition to a host of other scenarios. For example, a customer may be unfamiliar with using a self-checkout terminal 200a and thus may seek assistance to complete scanning, payment and/or bagging operations at the self-checkout terminal 200a. Also, a customer may be trying to purchase age restricted items and thus, an attendant will need to be notified to verify the age of the customer before the customer is allowed to complete the transaction.

Each of the supervisory stations 300 can exert supervisory control over the POS terminals 200. The supervisory station 300 can communicate directly to the POS terminals 200 and/or communicate via the communication controller 700. Supervisory control by a supervisory station 300 may be self-initiated (i.e., in response to input from a supervisor operating the supervisor station 300) or in response to communications received from the POS terminals 200 and/or communication controller 700. For example, a supervisor may initiate supervisory control over a POS terminal 200 to provide assistance with a transaction. The supervisory control allowing supervisory operations as well as POS terminal operations to be performed via the supervisory station 300. Examples of supervisory control performed by a supervisory station 300 are voiding an incorrect entry within a transaction, correcting the transaction and/or entering information facilitating a transaction such as a coupon and/or rewards card number. Another example of supervisory control includes a supervisory control station 300 accepting a message relating to an issue with a POS terminal 200 such as a weight violation (i.e., weight of item is not within a corresponding expected range). The weight violation can be displayed and responded to using the supervisory station 300. For example, weight violation screen may be displayed on a display of the supervisory station 300, and remain displayed until the violation is cleared by the customer using a POS terminal 200 or a supervisor using the supervisory station 300.

To coordinate the control and communications within the system 100, the communications controller 700 is provided. Referring to FIG. 1, the communications controller 700 includes an alert server 400 and one or more adapters 500. The alert server 400 receives and processes information from the POS terminals 200 and the supervisory stations 300. The alert server 400 also receives and processes information from the wrist-worn wearable devices 600 via the adapters 500.

The alert server 400 according to an example embodiment performs logic operations and supervisory processes that allow for alert prioritization, message communication, action management, application message translation, image creation and lane management. The result of the above logic operations and supervisory processes performed by the alert server 400 are provided to an adapter 500, which then develops alert information that is processible by and tailored for a corresponding wrist-worn wearable device 600.

The adapters 500 receive and process information from the wrist-worn wearable devices 600 and the alert server 400. According to example embodiments of the present invention, the alert server 400 and adapters 500 are used to allow effective and efficient communications and operations between the supervisory stations 300, POS terminals 200 and wrist-worn wearable devices 600. For example, wrist-worn wearable devices impose limitations due to size, graphics capabilities, input availability, and limited processing capability. For example, wrist-worn wearable devices 600 do not include a true operating system for processing communications and data. Stated differently, the wrist-worn wearable devices 600 must receive information in a specific format to be handled correctly or effectively. Further, the output or responses from a wrist-worn wearable device 600 are also limited based on specifications of the wrist-worn wearable device 600. An example of a wrist-worn wearable device 600 is the MICROSOFT BAND. The MICROSOFT BAND is a thin client which is dependent on the Operating System present on a phone or on a desktop computer (Windows 8.1+ with Windows Store). The MICROSOFT BAND computational ability is limited to displaying information in a known format and communicating button presses back to the communications controller. It is similar to a server/terminal relationship, although the thin client can do more than a terminal. Other wrist-worn wearable devices (such as e.g., SAMSUNG GEAR, APPLE WATCH, FITBIT, PEBBLE TIME, GARMIN devices) could be used in connection with example embodiments of this application.

Figure 2:
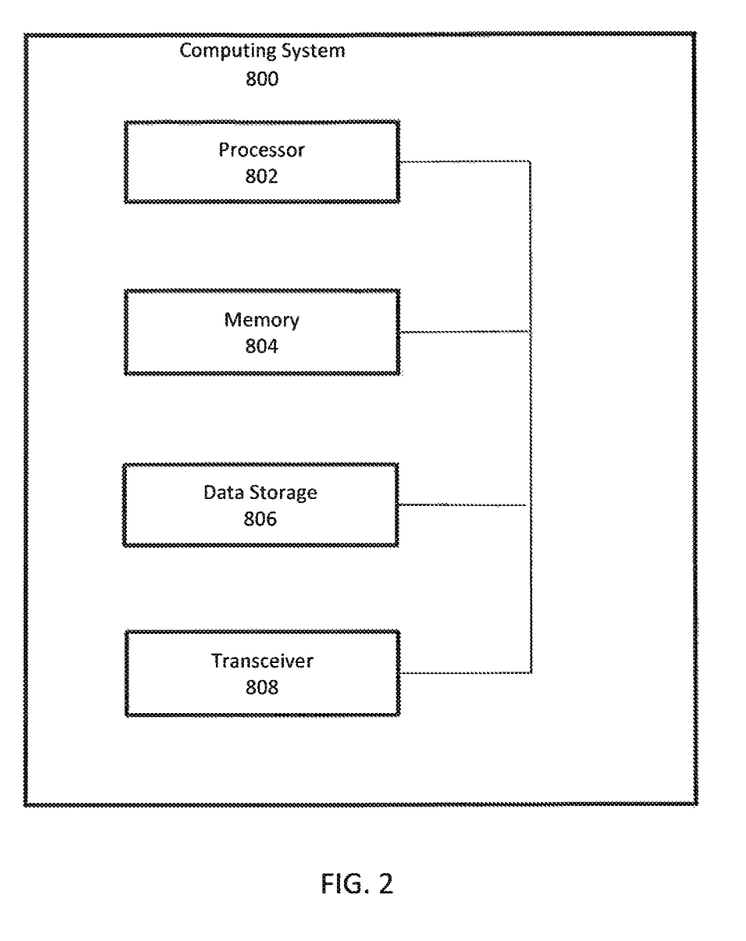
FIG. 2 illustrates an example computing system that may be configured to operate as one or more of various components of the checkout system described with respect to FIG. 1.

The POS terminals 200, supervisory stations 300, alert server 400, and adapter 500 run an operating system that provides enough communication and processing capabilities that information is more easily communicated and processed. For example, FIG. 2 illustrates a block diagram of an example computing system 800 representing hardware that may be used to perform operations of the POS terminals 200, supervisory stations 300 and communications controller 700. The computing system 800 is a combination of hardware and software implementing one or more of the POS terminals 200, supervisory stations 300 and communications controller 700.

As an example, the computing system 800 includes a processor 802, memory 804, data storage 806 and transceiver 808. The processor 802, memory 804, data storage 806 and transceiver 808 are communicatively coupled. Information and/or data may be input and/or output to the computing system 800 via the transceiver 808, for example.

In general, the processor 802 may include any suitable special-purpose or general-purpose computer, computing entity, or processing device including various computer hardware or software modules and may be configured to execute instructions stored on any applicable computer-readable storage media. For example, the processor 802 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 802 may include any number of processors configured to, individually or collectively, perform or direct performance of any number of operations described in the present disclosure. Additionally, one or more of the processors may be present on one or more different electronic devices, such as different servers.

In some embodiments, the processor 802 may interpret and/or execute program instructions and/or process data stored in the memory 804, the data storage 806, or the memory 804 and the data storage 806. In some embodiments, the processor 802 may fetch program instructions from the data storage 806 and load the program instructions in the memory 804. After the program instructions are loaded into memory 804, the processor 802 may execute the program instructions.

For example, in some embodiments, the alert server 400 and/or one or more adapters 500 may be included in the data storage 806 as program instructions. The processor 802 may fetch the program instructions of the alert server 400 or one or more adapters 500 from the data storage 806 and may load the program instructions of the alert server 400 or one or more adapters 500 in the memory 804. After the program instructions of, the alert server 400 and/or one or more adapters 500 are loaded into memory 804, the processor 802 may execute the program instructions such that the computing system 800 may implement the operations associated with the communications controller 700 as directed by the instructions. Information and/or data may be input and/or output to the computing system 800 via the transceiver 808.

The memory 804 and the data storage 806 may include computer-readable storage media for carrying or having computer-executable instructions or data structures stored thereon. Such computer-readable storage media may include any available media that may be accessed by a general-purpose or special-purpose computer, such as the processor 802. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 802 to perform a certain operation or group of operations.

Modifications, additions, or omissions may be made to the computing system 800 without departing from the scope of the present disclosure. For example, in some embodiments, the computing system 800 may include any number of other components that may not be explicitly illustrated or described.

As noted above, the communication controller 700 provides a common centralized communications controller that is able to process information, perform necessary logic operations, and identify actions to be performed by one or more of the supervisor terminals 300, POS terminals 200, and/or wrist-worn wearable devices 600.

The communications controller 700 can communicate a request or status inquiry to each of the supervisor terminals 300, POS terminals 200 and wrist-worn wearable devices 600. For example, a broadcast message may be prepared and sent by the communications controller 700 to all the other various components of the system 100. Also, the communications controller 700 may prepare and send an individual unique message to any of the other various components of the system 100. After the communications controller 700 sends a request or status inquiry, the communications controller 700 awaits a response from one or more of the other various components (i.e., supervisory stations 300, POS terminals 200 and wrist-worn wearable devices 600) of the system 100. If responses are generated by multiple of the other various components, the communications controller 700 will perform an arbitration function to determine the response or responses used to control the POS terminals 200, for example. In one implementation, the communications controller 700 may simply accept a response from the first responding supervisory station 300 or wrist-worn wearable device 600. In some cases, additional responses may also be accepted if they do not conflict with the first response and are still relevant, but will be ignored if the responses are no longer relevant (such as a weight violation that has already been cleared).

When supervisory control over a POS terminal 200 is required, the POS terminals signal processor circuitry (which may include, e.g., a processor, data storage, memory and other hardware, software, and associated interfaces such as described above with respect to FIG. 2) generates transaction information. The transaction information is sent from the POS terminal 200 to the communications controller 700. The transaction information identifies the related POS terminal 200 as well as an issue triggering the transmission of the transaction information. The transaction information may provide a status to the communications controller 700 and/or indicate some action is required for the POS terminal 200 to continue with the transaction. For example, transaction information may be sent from the terminal 200 to the communications controller 700 in response to a customer pressing a "Help" button on the POS terminal 200. Methods and operations triggered in response to the transmission of transaction information as well as examples of transaction information are described below.

Figure 3:
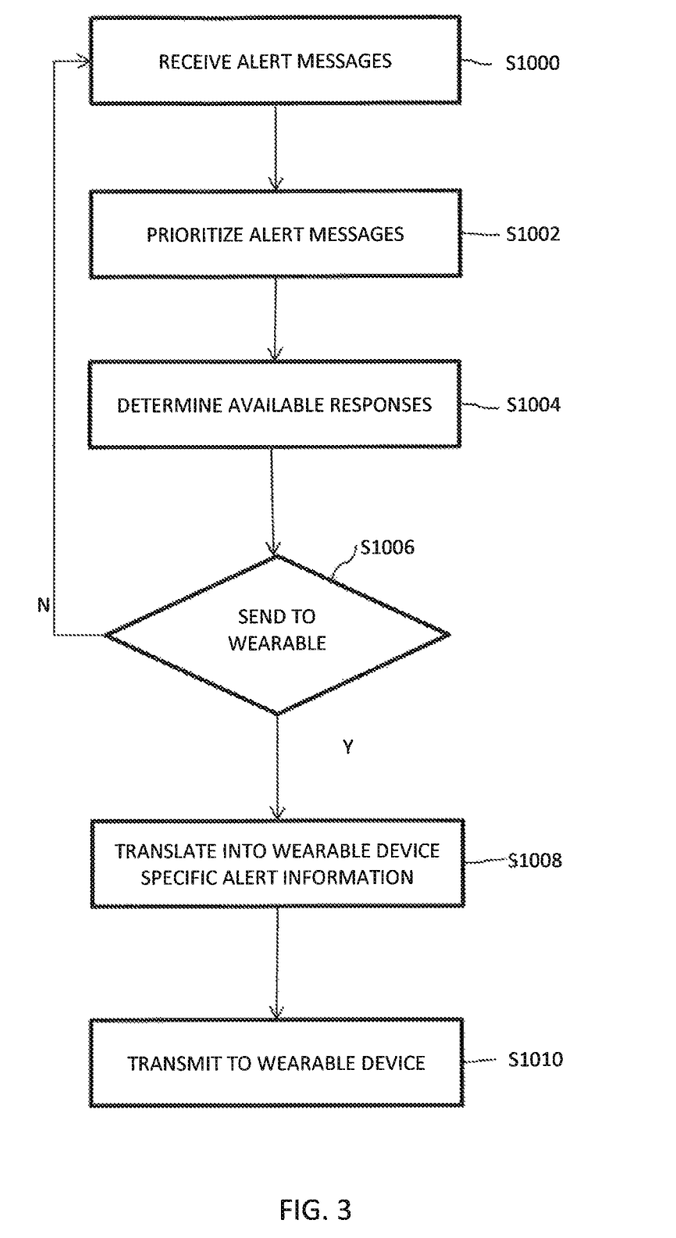
FIG. 3 is a flow chart of an example embodiment of a method performed by an alert server within the checkout system of FIG. 1.
Figure 4:
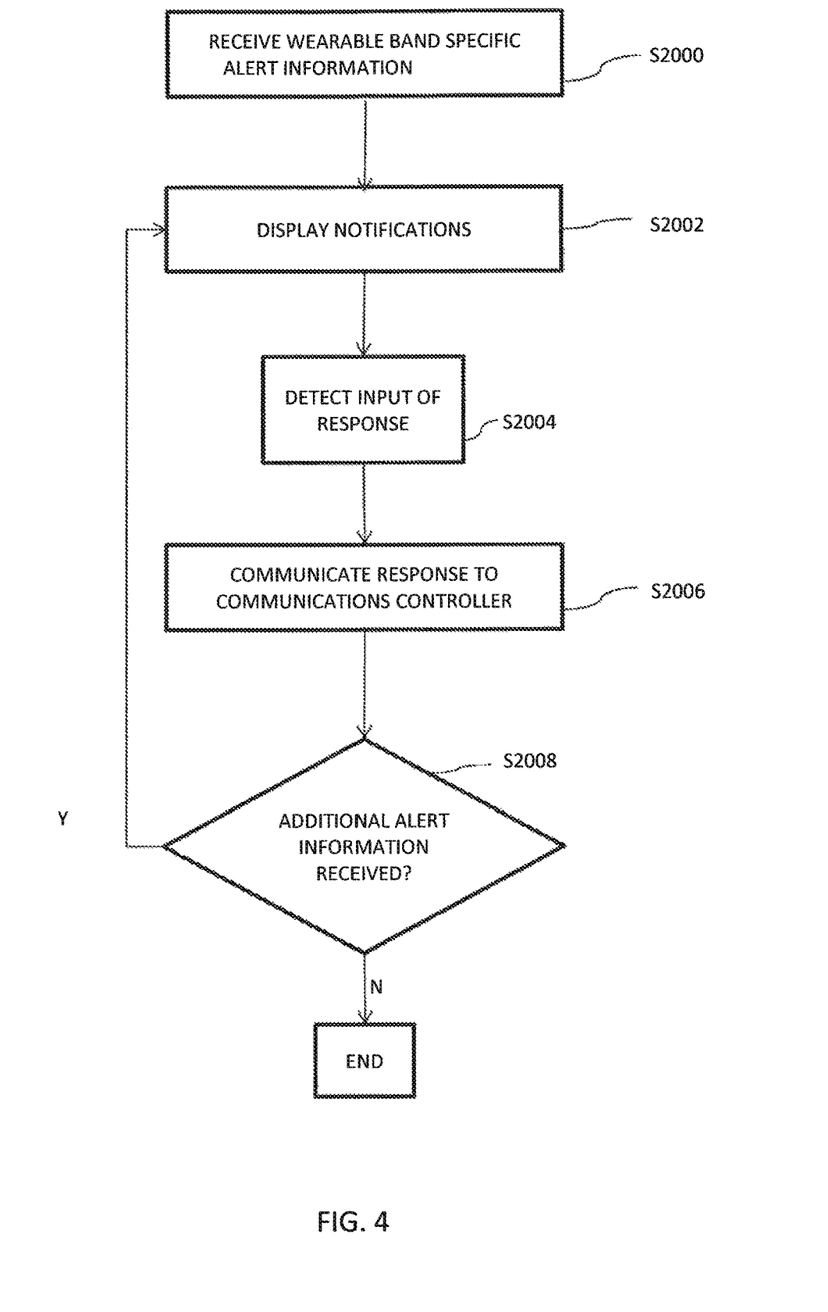
FIG. 4 is a flow chart of an example embodiment of a method performed by a wrist-worn wearable device within the checkout system of FIG. 1.

FIGS. 3 and 4 are flow charts showing a method and operations that may be used in implementations of the system 100.

FIG. 3 is a flowchart illustrating an example embodiment of a method performed by the communications controller 700 (which may include, e.g., a processor, data storage, memory and other hardware, software, and associated interfaces such as described above with respect to FIG. 2). As described with respect to FIG. 1, the communications controller 700 includes an alert server 400 and one or more adapters 500.

Figure 10:
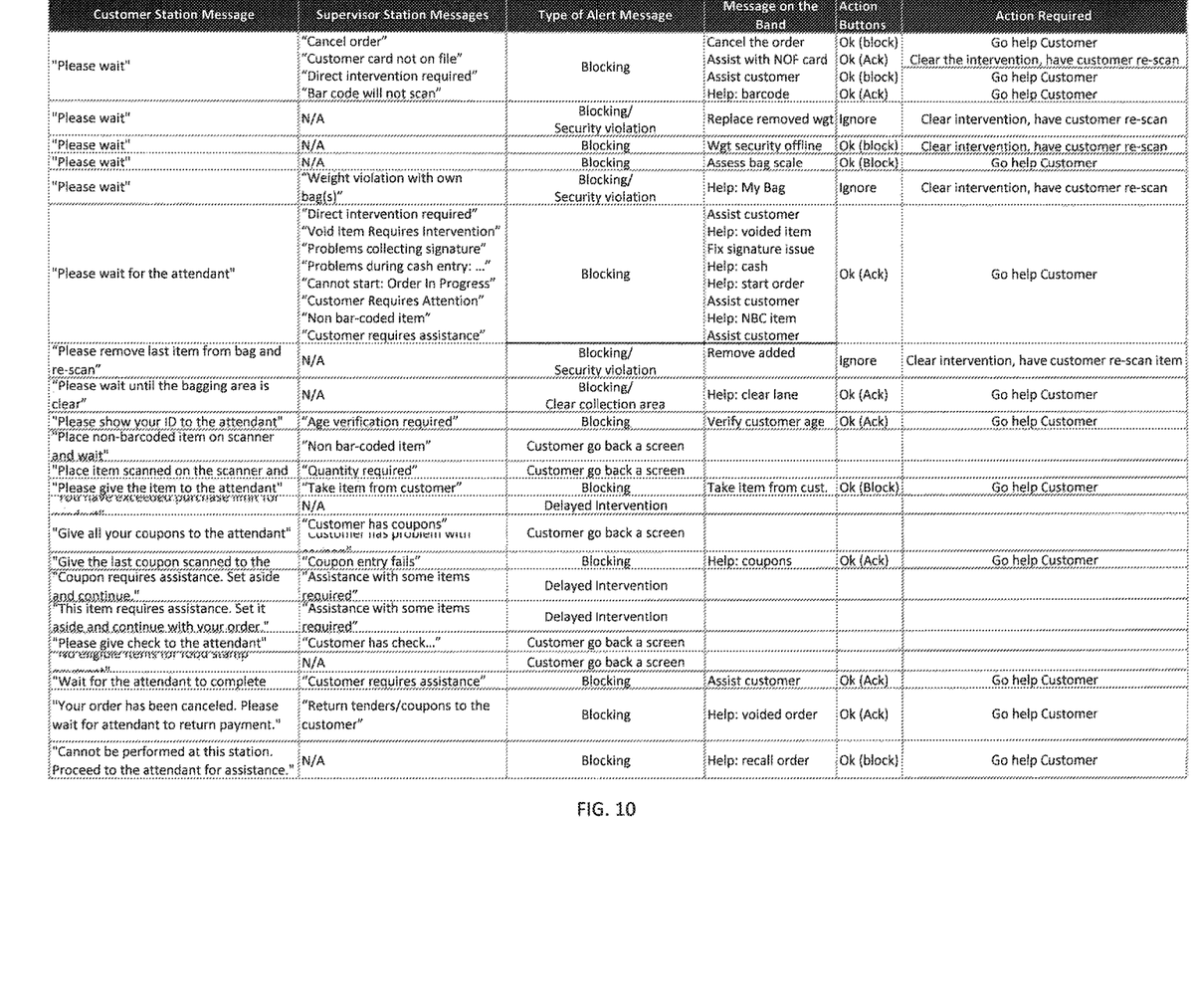
FIG. 10 is an example of an Alert Message Table according to an example embodiment.

Referring to FIG. 3, the alert server 400 receives transaction information from one or more of the POS terminals 200 (S1000). The transaction information identifies a POS terminal 200 and an issue relating to the self-checkout terminal that resulted in the generation of the transaction information by the POS terminal 200. In response to receiving the transaction information, the alert server 400 processes the transaction information. For example, the alert server 400 may extract self-checkout terminal ID and the issue relating to the self-checkout terminal that resulted in the generation of the transaction information by the POS terminal 200. Hereafter, the extracted issue is referred to as an alert message. According to an example embodiment, the alert server 400 includes a data storage including a plurality of alert messages relating to a POS terminal 200 that would result in generation of the transaction information, as well as characteristics associated with the respective alert messages. For example, characteristics associated with alert messages include a brief text description of the issue, an ID associated with the issue, a priority associated with the issue, and available responses to acknowledge or resolve the issue. Table 1 is a more simplified version of an Alert Message Table identifying example alert messages and characteristics that could be stored within a table. Table 1 is primarily used to further explain example embodiments of the invention below. FIG. 10 illustrates another example of an Alert Message Table.

TABLE 1

Alert Message Table

| ALERT MESSAGE | PRIORITY | AVAILABLE RESPONSES | DEVICE INPUTS | Supervisory Action |
|---|---|---|---|---|
| cancel order | high | Resolve | OK (clear) | clear alert |
|  |  | Acknowledge | OK (block) | go to customer |
| rewards issue | medium | Resolve | OK (clear) | clear alert |
|  |  | Acknowledge | OK (block) | go to customer |
|  |  | Delay | OK (delay) | go to customer |
| weight issue | medium | Resolve | OK (clear) | clear alert |
|  |  | acknowledge | OK (block) | go to customer |
|  |  | delay | OK (delay) | go to customer |
| payment issue | high | resolve | OK (clear) | clear alert |
|  |  | acknowledge | OK (block) | go to customer |

TABLE 1-continued

Alert Message Table

| ALERT MESSAGE | PRIORITY | AVAILABLE RESPONSES | DEVICE INPUTS | Supervisory Action |
|---|---|---|---|---|
| customer help | medium | acknowledge | OK (clear) | go to customer |
| age verification | high | resolve | OK (clear) | clear alert |
| | | acknowledge | OK (block) | go to customer |
| change low | Low | acknowledge | OK (clear) | clear alert |
| receipt paper low | Low | acknowledge | OK (clear) | clear alert |
| security tag | high | resolve | OK (clear) | clear alert |
| | | acknowledge | OK (block) | go to customer |

The first column of Table 1 identifies sample alert messages briefly described below. A cancel order alert message may be initiated to void an entire transaction or one purchase of a transaction. For example, if a customer is attempting to purchase an age restricted item, but realizes he or she does not have an ID or other evidence to present to an attendant for age verification, the transaction specific to the age restricted item could be voided. Alternatively, a customer may realize after scanning a number of items that he or she has forgot a method of payment and cannot purchase the items at this time. In this scenario, the entire transaction could be canceled.

A rewards issue alert message may be triggered when a rewards number is not recognized or has been deactivated, for example. A weight issue alert message may be in response to a detected discrepancy between the actual weight of an item and the expected weight of that item, for example. A payment issue alert message is related to a payment not being accepted, or a request by a customer to use a different form of payment, for example. A customer help alert message may be in response to a request for assistance by the customer, a price check situation, or triggered in response to a difficulty scanning or otherwise processing an item. An age verification alert message may be triggered in response to scanning an age restricted item such as alcohol. The change low alert message relates to a POS terminal being low on money that would be provided in response to a cash payment or request for cash back from a purchase. The receipt paper low alert message relates to a POS terminal being low on receipt paper required to print receipts. The security tag alert message relates to an item that includes a type of security device that should be deactivated upon purchase to avoid an alarm being triggered upon exiting a store, for example.

Based on the alert message, the alert server 400 obtains the characteristics associated with the alert message and the method described with respect to FIG. 3 continues. The columns other than the first column of Table 1 identify example characteristics associated with the alert messages. The last column (i.e., right-hand column) of Table 1 shows a characteristic that refers to an action performed by a supervisor such as clear alert or go to customer. Clear alert refers to the alert message being cleared and not necessarily needing to go to the customer or POS terminal 200. Go to the customer indicates the supervisor needs to further assist the customer. The characteristics within columns 2 through 4 of Table 1 are described in more detail later.

Referring back to FIG. 3, the alert server 400 receives a plurality of transaction information from one or more POS terminals 200, and processes the plurality of transaction information. Part of the processing performed by the alert server 400 according to an example embodiment includes prioritizing alert messages corresponding to the plurality of transaction information (S1002). As noted above, a table within a data storage associated with the alert server 400 includes a priority associated with different alert messages. Example of different classifications of priority include alert messages that stop/block a transaction from continuing at the POS terminal 200, alert messages that indicate a customer needs or is requesting assistance, and alert messages that are informational messages. Also, the amount of time an alert message has been pending or waiting for a response may be used is assigning a priority to an alert message. It is worth noting that the prioritization by the alert server 400 provides a user convenience to the supervisor in that the supervisor can simply focus on resolving the highest priority alert message and not be concerned with first determining what alert message should be handled first.

Alert messages that stop a transaction from continuing and require action by an attendant or supervisor have the highest priority. Examples of high priority alert messages shown in the second column of Table 1 include a request to cancel an order, payment issue, age verification and security issue.

Alert messages having the lowest priority are alert messages that are informational notices. Examples as shown in Table 1 include a notification that receipt paper is low in one of the POS terminals 200, a notification that available money or change is low in one of the POS terminals 200. Another example could be a simple notification that a POS terminal 200 is currently in use.

Alert messages having a medium priority are alert messages in which a customer is requesting assistance and/or information, but the transaction may continue on the POS terminal 200 at least until payment is required. Examples of alert messages shown in Table 1 that have a medium priority include a customer rewards card or number not being recognized, an alert message entered via an input by a customer via a help or assist input or button at the POS terminal 200, or a weight discrepancy alert message.

A priority associated with an alert message could be lowered in response to an input from a supervisory station 300 or a wrist-worn wearable device 600. For example, if an alert message regarding the purchase of an age restricted item is received by a wrist-worn wearable device 600 or a supervisory station 300, a supervisor could choose to acknowledge the high priority invention request, which may allow the transaction to continue and reduce the priority associated with the alert message to a medium priority while additional items are scanned or purchased until payment is required for the items. If the supervisor has not resolved the alert message prior to when payment is required, the alert message could then go back to a high priority since the transaction is finished with the exception of payment. For example, once a transaction is finished with the exception of payment, the POS terminal 200 provides an indication to the communications controller 700 that there is at least one alert message to be processed, the alert server 400 will assign a highest priority to the at least one alert message because the transaction is stopped until the alert message is resolved and payment can be processed.

Referring to FIG. 3, the alert server 400 also determines available responses for the alert messages (S1004). Examples of available responses include to accept, reject, delay, clear, tag, and resolve the alert messages. The available responses are associated with the different alert messages. For example, as noted above, a table stored in a data storage associated with the alert server 400 may include responses that are available for responding to the different alert messages. In column 3 of Table 1, the available responses are identified as resolve, acknowledge, and delay.

The above described operations shown in FIG. 3 (S1000, S1002 and S1004) represent an example of an alert server 400 of the communications controller 700 developing alert information from the received transaction information and characteristics associated with the respective alert messages. The alert information developed with the above-described operations (S1000) may be sufficient to provide to the supervisory station 300 having an operating system that provides enough communication and processing capabilities that alert information is more easily communicated and processed. Referring to FIG. 3 if the alert information is to be provided to the supervisory station 300, the alert information is communicated to the supervisory station 300, and the alert server 400 can await a response. Further, the method illustrated in FIG. 3 may proceed back to receiving and processing additional received alert messages (S1000, S1002, S1004).

However, according to example embodiments the alert information may also be provided to a wrist-worn wearable device 600 (Yes in S1006). It is noted that alert information could be provided only to a supervisory station 300, only to the wrist-worn wearable device 600, or to each of the supervisory station 300 and wrist-worn wearable device 600. If multiple responses are received in response to alert information communicated by the alert server 400 (S1006), the alert server 400 will perform an arbitration function to determine the response or responses used to control the POS terminals 200, for example.

As previously discussed, the wrist-worn wearable devices 600 must receive information in a specific format to be handled correctly or effectively, and the output or responses from a wrist-worn wearable device 600 are also limited based on specifications of the wrist-worn wearable device 600. The one or more adapters 500 translate the alert information developed by the alert server 400 into a wrist-worn wearable device 600 specific format (S1008). For example, a wrist-worn wearable device 600 has a limited display and formatting requirement for both displaying and interacting with the wrist-worn wearable device 600. Accordingly, the adapter 500 adapts the alert information into the necessary format to be properly displayed on the wrist-worn wearable device 600. An example of a wrist-worn wearable device is the band illustrated in FIGS. 5-9. As previously noted, one example of a wrist-worn wearable device compatible with example embodiments of this application is the MICROSOFT BAND. MICROSOFT BAND SDK is a user interface that enables use of the various functionalities and capabilities of the MICROSOFT BAND. Accordingly, in one example, the adapter 500 formats communications in a manner understood and processible by MICROSOFT BAND SDK.

Figure 5:
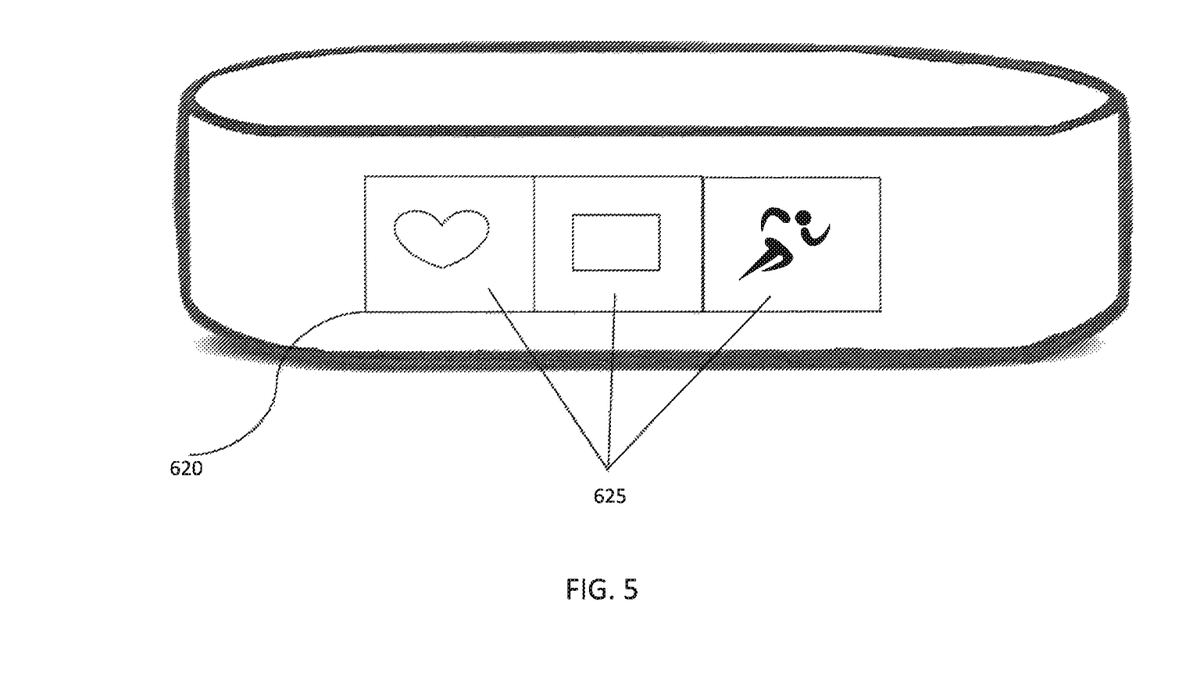
FIG. 5 is an example of a wrist-worn wearable device and display illustrating images of a navigation screen of a wrist-worn wearable device.

As an example involving the MICROSOFT BAND, the alert server 400 may receive a Alert Server "ID_REQUIRED, Action=Intervention" from a POS terminal 200. The alert server 400 looks up "ID_Required" within a table to retrieve a priority such as "priority=5", Header text "Customer", Messages Text "Check Age is valid", and Button Text "Ok". The alert server 400 sends this information to the adapter 500. The adapter 500 receives the information and overwrites or modifies the received information according to the MICROSOFT BAND specifications and creates a Bluetooth connection to MICROSOFT BAND. The MICROSOFT BAND uses MICROSOFT API (SDK) and pushes the information to the MICROSOFT Tile (e.g., in a manner similar to pushing content to a web page). For example, the pushed information is in a form containing "Text, text boxes, layouts, X/Y coordinates, button position/text" that determine how the notification is to be displayed on the MICROSOFT BAND. The MICROSOFT BAND receives the form and displays notification to the user under the tiles as instructed and in the format received. The MICROSOFT BAND is not capable of modifying the form or content of the message received from the adapter 500. For example, FIG. 5 illustrates a wrist-worn wearable device 600 having a display 620. The display 620 displays a graphical user interface (GUI). The GUI illustrated in FIG. 5 shows multiple tiles or images that a user can select 625. For example, one of the tiles, such as the middle tile with the square could be used to open an application or interface for displaying and responding to alert information provided in according with example embodiments of this application.

Figure 6:
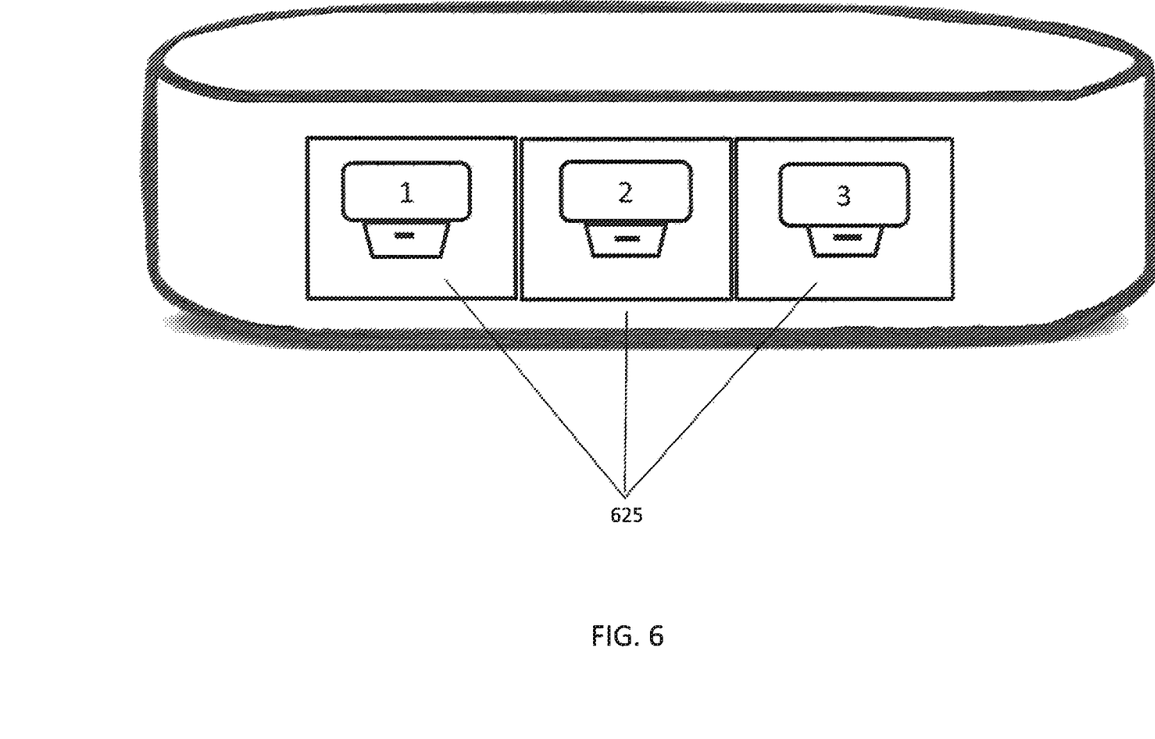
FIG. 6 is an example of the wrist-worn wearable device displaying a POS terminal selection or browsing function according to an example embodiment.

FIG. 6 illustrates an example of the wrist-worn wearable device 600 displaying a POS terminal selection or browsing function. Referring to FIG. 6, each of the tiles 625 illustrates a POS terminal icon along with a number. The number may represent the POS terminal ID, for example. Selecting one of the tiles would display information of the POS terminal 200 corresponding to the number.

Figure 7:
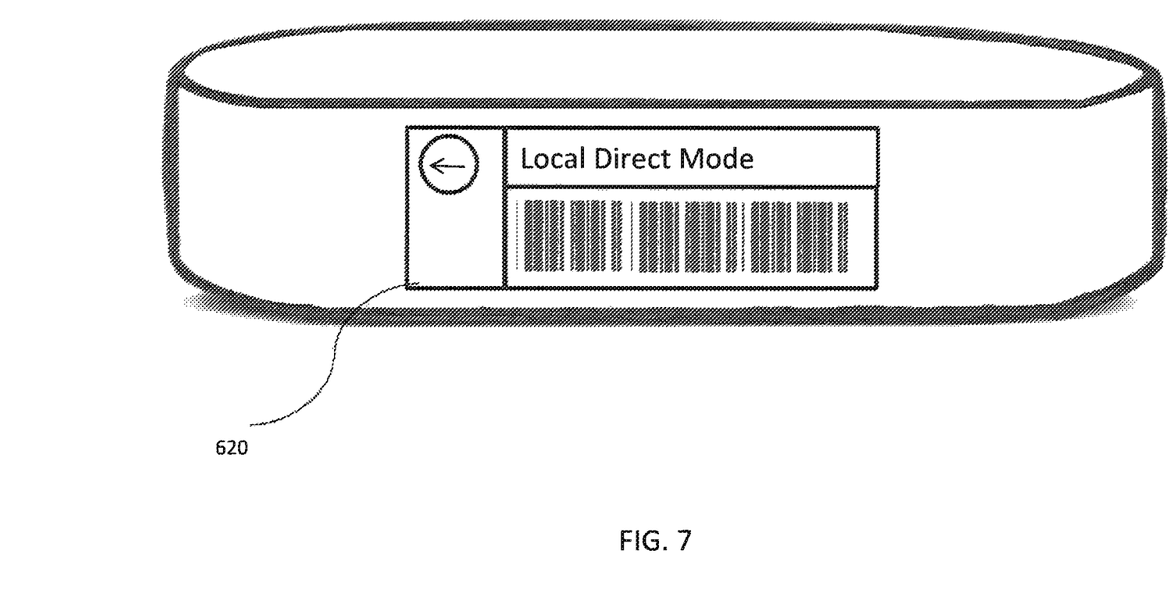
FIG. 7 is an example of a wrist-worn wearable device displaying a barcode according to an example embodiment.

FIG. 7 illustrates an example of a barcode that may be displayed on the display 620 of the wrist-worn wearable device 600. The barcode being displayed to a supervisor that is used to resolve an alert message. For example, the barcode may be used to enter a special mode used by a supervisor to interact with a POS terminal 200.

Figure 8:
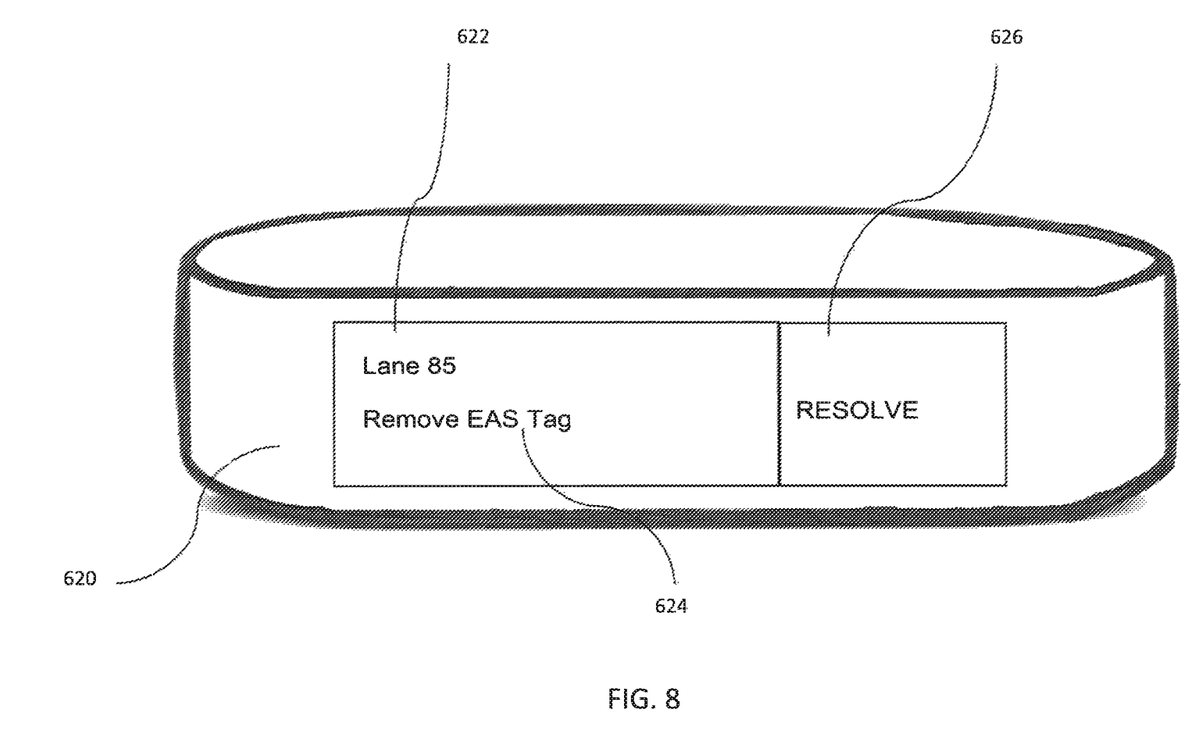
FIG. 8 is an example of a wrist-worn wearable device displaying a notification corresponding to an alert message according to an example embodiment.

FIG. 8 illustrates an example of a notification displayed on the wrist-worn wearable device 600 that is based on the alert information generated for a respective alert message as well as based on the specifications of the wrist-worn wearable device 600. Referring to FIG. 8, the display 620 illustrates a POS terminal ID 622 "Lane 85", text 624 identifying an action to be taken to resolve the issue at the POS terminal 200 "Remove EAS tag". In the example of FIG. 8, a security tag is included on a retail item that requires removal. The text 624 shown in FIG. 8 describes the action to be taken (see examples in last column of the table in FIG. 10 or last column of Table 1). Alternatively, the text 624 could identify or describe the issue needing resolved, e.g., "security tag". One could consider the "remove EAS tag" an active message and the "security tag" text a passive message. Displaying an active message or passive message could be a setting selected according to supervisor preference. The display 620 also includes in input area 626 stating "resolve". (Other examples that could be included in input area 626 are shown in the fourth column of Table 1 or fifth column of the table in FIG. 10.) Once the tag is removed in this example, the supervisor could touch the input area 626 to indicate that the alert message triggering the displayed notification is resolved or completed at which time the notification would no longer be displayed. The displayed "resolve" illustrates that resolve is one of the available response to the alert message relating to the notification shown in FIG. 8. Other examples of available responses are given in the third column of Table 1.

Figure 9:
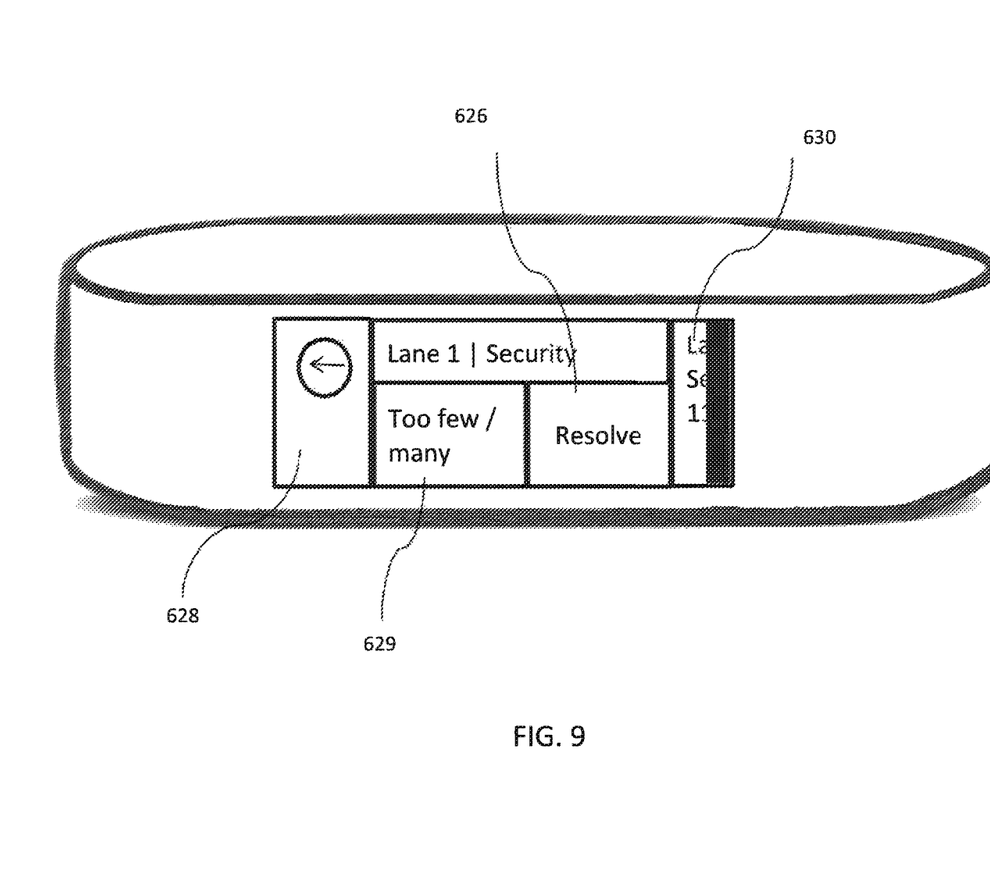
FIG. 9 is an example of a wrist-worn wearable device displaying a notification corresponding to an alert message according to an example embodiment.

FIG. 9 illustrates an example of a display for processing a first notification that also provides an indication that another notification requires processing. FIG. 9 also illustrates an example of a possible navigation technique for navigating between different functionalities provided by example embodiments of this application and displayed using the wrist-worn wearable device 600. One functionality is to display and receive inputs relating to notifications for all the monitored POS terminals 200. A second functionality may be a lane browser functionality allowing a user to select only notifications relating to a specific lane.

For example, referring to FIG. 9, a first notification is a security notification for Lane 1 and is illustrated in a middle portion of the display 620. An arrow is shown in the top left portion of the display. The left portion of the display 628 may be configured to receive an input used to navigate from a first functionality to a second functionality provided by example embodiments. Alternatively, the left portion of the display 628 could be used to receive input allowing navigation from one notification to a second notification according to a different example embodiment. The right side portion of the display 630 displays an edge portion of a second notification that may be an indication to the supervisor that there is currently more than one alert message to be processed. Different navigation techniques may be used to navigate between notifications such as a swiping motion being detectable by the wrist-worn wearable device 600. Alternatively, when the displayed notification in the middle portion of the display 20 is resolved, another notification could automatically be displayed to the user in the middle portion of the display. The display order being automatically controlled based on priorities previously assigned by the alert server 400. The allowable navigation techniques and inputs available may be limited and/or defined by the wrist-worn wearable device 600. Further, it is noted that the order in which the notifications are presented and/or coloring of a portion of the display, or other indication may be used to represent a priority associated with a display notifications. FIGS. 5-9 demonstrate issues and/or limitations of a wrist-worn wearable device 600, such as limited screen size and input availability. The translation of alert information developed by the alert server 400 into a wrist-worn wearable device 600 specific format (S1008) allows the wrist-worn wearable device 600 to be effectively and efficiently used within a method according to an example embodiment such as that illustrated by the flowcharts of FIGS. 3 and 4. The wrist-worn wearable device specific alert information is then communicated to the wrist-worn wearable device 600 by a transceiver of the communications controller 700 (such as the transceiver 808 of computing system 800).

FIG. 4 illustrates a method performed by wrist-worn wearable device 600 that can be implemented because of the processing, operations and communication performed by the alert server 400 and one or more adapters 500 of the communication controller 700. The wrist-worn wearable device 600 receives the translated alert information (S2000). Because of the formatting and processing performed by the adapter 500, the wrist-worn wearable device 600 is able to properly receive the translated alert information. The wrist-worn wearable device 600 then displays a notification on a display 620 of the wrist-worn wearable device 600 (S2002).

Example notifications are displayed in FIGS. 5-9 that were discussed above. For example, a notification includes a POS terminal identification 622, text identifying the alert message from the POS terminal 620, and one or more input areas 626 configured to receive a user input that identifies an available response to the alert message.

Column 4 of Table 1 list examples of Device Inputs that may be shown as part of the notification. The inputs listed in column 4 include "OK (clear)", "OK (block)", and "OK (delay)". The "OK (clear)" input may represent an input that clears an alert message. The input may result in the communications controller 700 communicating a response to a POS terminal 200 that causes the POS terminal to clear the alert message and allow the transaction or operation to continue. The "OK (block)" input may represent an input that acknowledges the alert message and notes that further action is going to be required. The input may result in the communications controller 700 communicating a response to a POS terminal 200 that causes the POS terminal to block the transaction from continuing until a supervisor can further assist with the transaction. The "OK (delay)" input may represent an input that acknowledges the alert message and notes that further action is going to be required, but allowing the transaction to continue. The input may result in the communications controller 700 communicating a response to a POS terminal 200 that causes the POS terminal to continue the transaction but notes a supervisor will need to further assist before the transaction can be completed.

After display of the one or more notifications, the wrist-worn wearable device 600 detects inputs from wrist-worn wearable device 600 (S2004). For example, the wrist-worn wearable device 600 is configured to detect an input, such as a user touch, in the input area 626 of the notification. The detected input will identify an available response associated with the alert message corresponding to the displayed notification. In response, to the input, the wrist-worn wearable device 600 will send a response to the communications controller 700 (S2006). For example, the wrist-worn wearable device 600 will communicate a response message via the adapter 500 to the alert server 400. The alert server will then communicate an appropriate instruction to the POS terminal 200 to acknowledge or resolve the alert message.

If there are additional notifications received by the wrist-worn wearable device 600, the additional notifications to be displayed and requiring a response (S2008). If there is additional alert information that has been received by the wrist-worn wearable device 600 (S2008), the method will be repeated. If there is no additional alert information received, the method will stop as illustrated in FIG. 4 until additional alert information is received.

Below is an explanation of an example implemented when a managed application on POS terminal (U-SCAN) is connected to a communications controller 700 according to an example embodiment and the wrist-worn wearable device 600 is a MICROSOFT BAND.

1. Managed Application (U-SCAN) connects to Alert Server and provides system ID (lane number, etc. . . . ).
2. Managed Application sends an Alert (a string ID with possible data like an age or weight, etc. . . . ) to Alert Server.
3. Alert Server uses the ID to open the AlertServerConfig.xml file and find the relevant alert information.
   a. Priority (numeric)
   b. Action (managed application dependant)
   c. Header Text
   d. Message Text 4. Alert Server sends data to adapter.
5. Adapter transforms data in MS brand compatible format (GUID, Tiles, etc. . . . ).
6. Adapter connects to band and pushes the information.
7. Band displays the information on the tile.
8. User presses button on band (i.e. acknowledge).
9. Band sends BUTTON PRESS to adapter.
10. Adapter sends BUTTON PRESS to alert server.
11. Alert Server sends BUTTON PRESS to managed application.
12. Managed Application process response (within its context).
13. Managed applications sends CLEAR alert (based on ID) to Alert Server.
   . . . process repeats . . .

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

The invention claimed is:

1. A computer-implemented method of processing checkout information within a retail checkout system having at least one Point of Sale (POS) terminal, a communication controller, and a wrist-worn wearable device, the method comprising:
   receiving, at the communication controller, transaction information from a POS terminal;
   processing, at the communication controller, the transaction information identifying the POS terminal and an issue relating to the POS terminal, the issue being at least one of a transaction of a POS terminal is stopped, assistance is requested at the POS terminal, and an information message is provided by the POS terminal;
   developing, at the communication controller, alert information to be transmitted to the wrist-worn wearable device and corresponding to the issue relating to the POS terminal, the alert information being based on the transaction information and specifications of the wrist-worn wearable device, the alert information causing the wrist-worn wearable device to display a graphical user interface (GUI) on a display;
   receiving, via the wrist-worn wearable device, the alert information;
   displaying, based on the instructions, a notification on the GUI of the display of the wrist-worn wearable device, the notification identifying the POS terminal and the issue relating to the POS terminal, the GUI having at least one of a POS terminal ID, input section, and text description of at least one of the issue relating to the POS terminal and action to be performed in response to the issue relating to the POS terminal;
   receiving an input via the wrist-worn wearable device;
   providing the received input to the communication controller;
   processing the input at the communication controller to determine a response for the issue relating to the POS terminal; and
   communicating the response from the communication controller to the POS terminal, wherein
   the communication controller not included within the POS terminal or the wrist-worn wearable device.

2. The method according to claim 1, wherein the transaction information is an alert message and identifies a type of intervention;
   the displaying displays at least one available response to the alert message; and
   the receiving receives the input via a touchpad presenting the GUI, the touchpad responsive to a user touch.

3. The method according to claim 2, further comprising:
   storing, within a storage, a table of a plurality of alert messages; a priority associated each of the plurality of alert messages; and at least one available response for responding to each of the plurality of alert messages;
   the processing the transaction information includes:
      identifying an alert message from the transaction information;
      obtaining from the table, a priority and available responses for responding to the identified alert message.

4. The method according to claim 3, wherein
   the developing develops the alert information according the priority and available responses for responding to the identified alert messages; and
   provides the alert information to the wrist-worn wearable device based on the priority and the available responses for responding to the identified alert messages.

5. The method according to claim 4, wherein the available responses for responding to the identified alert message is acknowledge the alert message, resolve the alert message or clear the alert message.

6. The method according to claim 1, wherein
   the receiving receives a plurality of transaction information from the at least one POS terminal; and
   the processing prioritizes the plurality of transaction information based on the issue relating to the POS terminal.

7. A communications controller for use in a checkout system including at least one POS terminal and a wrist-worn wearable device in communication with the communications controller, the communications controller comprising:
   an alert server configured to receive transaction information from a POS terminal, process the transaction information to identifying the POS terminal and an issue relating to the POS terminal to be resolved, the issue being at least one of a transaction of a POS terminal is stopped, assistance is requested at the POS terminal, and an information message is provided by the POS terminal; and
   an adapter configured to develop alert information for the wrist-worn wearable device to enable the wrist-worn wearable device to display a notification associated with the issue relating to the POS terminal and to receive an input in response to the developed alert information corresponding to the issue relating to the POS terminal,
   the alert information being based on the transaction information and specifications of the wrist-worn wearable device,
   the alert information causing the wrist-worn wearable device to display a graphical user interface (GUI), the GUI displays a notification identifying the POS terminal and the issue relating to the POS terminal, the GUI having at least one of a POS terminal ID, input section, and text description of at least one of the issue relating to the POS terminal and action to be performed in response to the issue relating to the POS terminal, wherein the adapter is further configured to process the input received from the wrist-worn wearable device to determine a response, and the alert server is further configured to communicate the response processed by the adapter to the POS terminal, wherein the adapter and alert server are not included within the POS terminal or the wrist-worn wearable device.

8. The communications controller according to claim 7, wherein the alert server identifies an alert message from the transaction information;

searches a table stored in a storage, the table includes a plurality of alert messages; a priority associated each of the plurality of alert messages; and available response for responding to each of the plurality of alert messages; and obtains from the table, a priority and available responses for responding to the identified alert message.

9. The communications controller according to claim 8, wherein the adapter develops the alert information according the obtained priority and available responses for responding to the identified alert messages; and provides the alert information to the wrist-worn wearable device based on the priority and the available responses for responding to the identified alert messages.

10. The communication controller according to claim 9, wherein the adapter receives the input from the wrist-worn wearable device in response to the alert information, the input representing a selection of one of the available response associated with the alert message; and the alert server determines a response message associated with the selected one of the available responses to the alert message and communicates the response message to the POS terminal to enable the POS terminal to resolve the alert message.

11. The communication controller according to claim 8, wherein the alert server receives a plurality of transaction information from the at least one POS terminal, and prioritizes the plurality of transaction information based on the issue relating to the POS terminal.

12. A checkout system comprising:

a POS terminal configured to process a retail transaction;

a wrist-worn wearable device configured to receive input from a user that provides supervisory support to the POS terminal; and a communication controller configured to receive transaction information from the POS terminal, process the transaction information identifying the POS terminal and an issue relating to the POS terminal, the issue being at least one of a transaction of a POS terminal is stopped, assistance is requested at the POS terminal, and an information message is provided by the POS terminal, and develop alert information for the wrist-worn wearable device to allow the wrist-worn wearable device to acknowledge or respond to the issue relating to the POS terminal, the alert information being based on the transaction information and specifications of the wrist-worn wearable device, the alert information causing the wrist-worn wearable device to display a graphical user interface (GUI) on the display, receive the input from the wrist-worn wearable device in response to a notification on the GUI of the display of the wrist-worn wearable device, the notification identifying the POS terminal and the issue relating to the POS terminal, the GUI having at least one of a POS terminal ID, input section, and text description of at least one of the issue relating to the POS terminal and action to be performed in response to the issue relating to the POS terminal, process the input at the communication controller to determine a response; and communicate the response from the communication controller to the POS terminal, wherein the communication controller not included within the POS terminal or the wrist-worn wearable device.

13. The checkout system according to claim 12, wherein the communications controller includes:

an alert server configured to receive the transaction information from the POS terminal, identify from the transaction information the POS terminal and the issue relating to the POS terminal; and an adapter configured to develop the alert information for the wrist-worn wearable device to enable the wrist-worn wearable device to display the notification associated with the issue relating to the POS terminal and to receive an input to resolve the issue relating to the POS terminal.

14. The checkout system according to claim 13, further comprising:

a storage configured to store a table of a plurality of alert messages; a priority associated each of the plurality of alert messages; and available response for responding to each of the plurality of alert messages, wherein the alert server identifies an alert message from the transaction information, and obtains from the table the priority and available responses for responding to the identified alert message, and the adapter develops the alert information according the obtained priority and available responses for responding to the identified alert messages.

15. The checkout system according to claim 14, wherein the adapter provides the alert information to the wrist-worn wearable device based on the priority and the available responses for responding to the identified alert messages, the alert information includes instructions interpretable by the wrist-worn wearable device.

16. The checkout system according to claim 15, wherein the wrist-worn wearable device displays at least one available response to the alert message, receives an input via a touchpad presenting the GUI and being responsive to a user touch, and communicates the received input to the alert server via the adapter.

17. The checkout system according to claim 13, wherein the alert server receives a plurality of transaction information from the at least one POS terminal, and prioritizes the plurality of transaction information based on the issue relating to the self-checkout terminal.

* * * * *